United States Patent [19]

DuLac et al.

[11] Patent Number: 5,257,391
[45] Date of Patent: Oct. 26, 1993

[54] DISK CONTROLLER HAVING HOST INTERFACE AND BUS SWITCHES FOR SELECTING BUFFER AND DRIVE BUSSES RESPECTIVELY BASED ON CONFIGURATION CONTROL SIGNALS

[75] Inventors: Keith B. DuLac, Derby; Bret S. Weber, Wichita, both of Kans.

[73] Assignee: NCR Corporation, Dayton, Ohio

[21] Appl. No.: 746,399

[22] Filed: Aug. 16, 1991

[51] Int. Cl.5 ............................................ G06F 13/00
[52] U.S. Cl. ...................................... 395/800; 395/250; 395/325; 395/575; 371/8.1; 371/11.1; 364/238.2; 364/239.7; 364/240.7; 364/DIG. 1
[58] Field of Search ............... 395/800, 575, 500, 425, 395/325, 250; 371/8.1, 10.1, 11.1

[56] References Cited

U.S. PATENT DOCUMENTS

| | | | |
|---|---|---|---|
| 4,375,589 | 3/1983 | Finnegan et al. | 395/325 |
| 4,500,958 | 2/1985 | Manton et al. | 364/200 |
| 4,546,429 | 10/1985 | Chan et al. | 395/325 |
| 4,571,671 | 2/1986 | Burns et al. | 364/200 |
| 4,612,613 | 9/1986 | Gershenson et al. | 364/200 |
| 4,733,349 | 3/1988 | Sumiyoshi et al. | 364/200 |
| 4,755,937 | 7/1988 | Glier | 364/200 |
| 4,821,170 | 4/1989 | Bernick et al. | 395/325 |
| 4,849,929 | 7/1989 | Timsit | 395/575 |
| 4,870,643 | 9/1989 | Bultman et al. | 371/11.1 |
| 4,914,656 | 4/1990 | Dunphy, Jr. et al. | 371/10.2 |
| 4,942,579 | 7/1990 | Goodlander et al. | 371/51 |
| 4,958,351 | 9/1990 | Flora et al. | 371/40.1 |
| 5,023,831 | 6/1991 | Bonke et al. | 395/375 |
| 5,056,000 | 10/1991 | Chang | 395/325 |
| 5,097,410 | 3/1992 | Hester et al. | 395/575 |
| 5,101,492 | 3/1992 | Schultz et al. | 395/575 |
| 5,134,619 | 7/1992 | Henson et al. | 371/40.1 |
| 5,175,836 | 12/1992 | Morgan | 395/425 |

OTHER PUBLICATIONS

"A Case for Redundant Arrays of Inexpensive Disks (RAID)" by David A. Patterson et al., Computer Science Division (EECS), Univ of California, Report No. UCB/CSD 87/391, Dec. 1987.
"Parity Striping of Disc Arrays: Low-Cost Reliable Storage with Acceptable Throughput" by Jim Gray, et al., Tandem Computers, Technical Report 90.2, Jan. 1990, Part Number:39596.

Primary Examiner—Thomas C. Lee
Assistant Examiner—Alpesh M. Shah
Attorney, Agent, or Firm—James M. Stover

[57] ABSTRACT

A disk array controller providing a variable configuration data path between the host system and the individual disk drives within a disk array and parity and error correcting code generation and checking. The controller includes host interface logic for converting data received from the host system via a 16 or 32-bit SCSI bus to 16, 32 or 64-bit data words multiplexed across one, two or four 16-bit buffer busses, and for converting data received from the buffer busses to the proper form for transmission to the host system. A bus switch, including an exclusive-OR circuit for generating parity information, is connected between the buffer busses and six disk drive busses for directing the transfer of data and parity information between selected buffer and drive busses. The controller further includes a storage buffer connected to the buffer busses to provide temporary storage of data and parity information. The host interface logic, bus switch and storage buffer, under the direction of an included processor and DMA control logic, performs array read and write operations requested by the host system in accordance with RAID level 1, 3, 4 or 5 protocols.

14 Claims, 13 Drawing Sheets

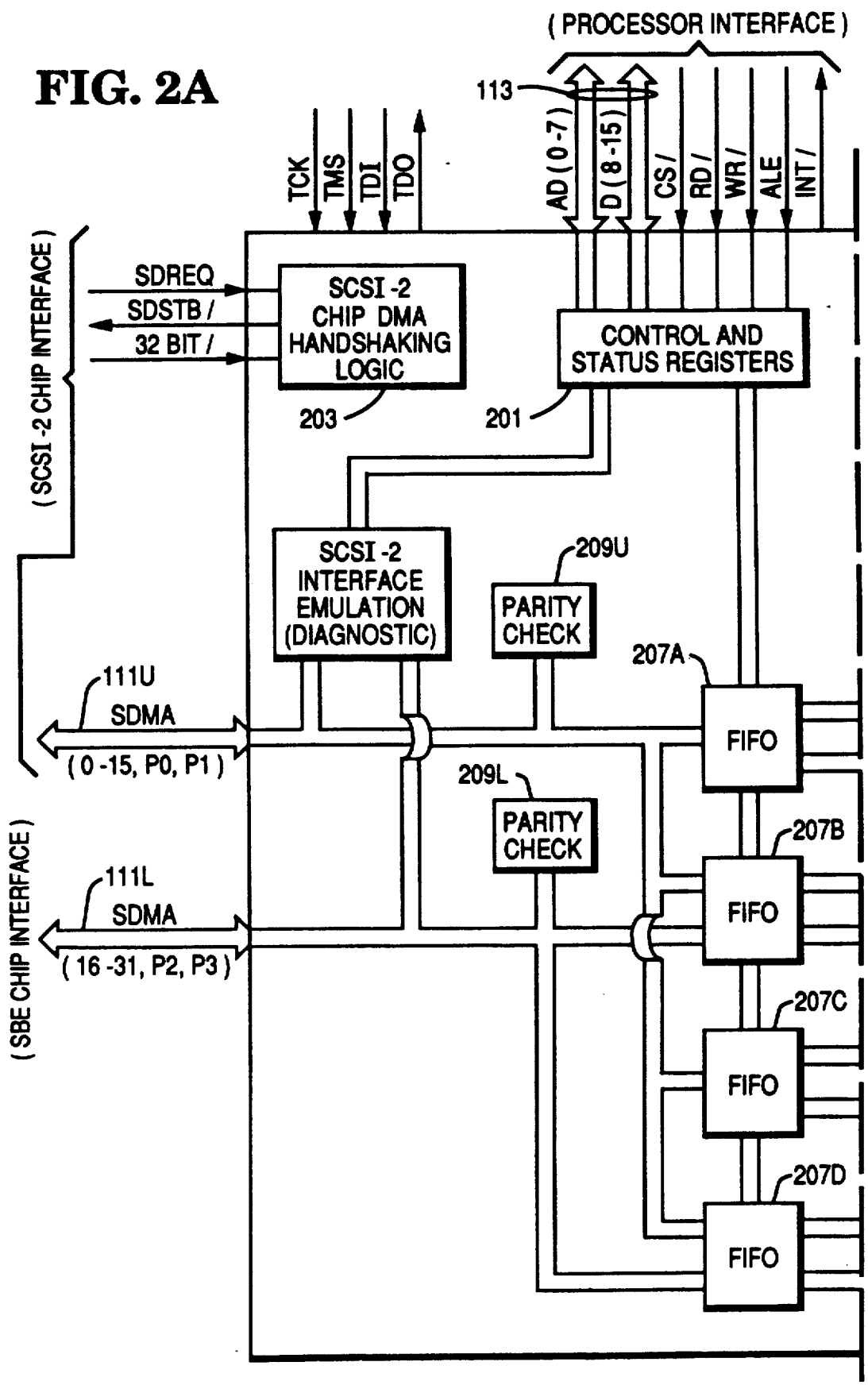

DISK CONTROLLER HAVING HOST INTERFACE AND BUS SWITCHES FOR SELECTING BUFFER AND DRIVE BUSSES RESPECTIVELY BASED ON CONFIGURATION CONTROL SIGNALS

The present invention relates to disk storage devices for computer systems and, more particularly, to a disk array controller for managing a plurality of disk storage devices.

BACKGROUND OF THE INVENTION

Dramatic increases in computer processing power and speed and in the speed and capacity of primary memory devices have been realized in recent years. Unfortunately, in contrast to processing and main memory technology advances, the rate of improvement in performance of secondary memory storage devices, primarily magnetic disks, has been modest. The substantial gains in performance and speed which continue to be realized for CPUs and main memory devices will be squandered if not matched by similar performance increases in secondary storage devices. For example, as the mismatch in performance of CPU and disk memory increases, disk I/O operations consume a greater proportion of CPU time.

Disk arrays have been proposed as a means to improve the performance of secondary storage devices, eliminating the expensive mismatch between CPU and secondary storage performance. A disk array, comprising a multiplicity of small, inexpensive disk drives connected in parallel, appears as a single large fast disk to the host system but offers improvements in performance, reliability, power consumption and scalability over a single large magnetic disk. In many applications disk arrays offer improvements in performance, reliability, power consumption and scalability over a single large magnetic disk.

Current disk array design alternatives are described in an article titled "A Case for Redundant Arrays of Inexpensive Disks (RAID)" by David A. Patterson, Garth Gibson and Randy H. Katz; University of California Report No. UCB/CSD 87/391, December 1987. The article describes five disk array arrangements, referred to as RAID levels. The simplest array, a RAID level 1 system, comprises one or more disks for storing data and an equal number of additional "mirror" disks for storing copies of the information written to the data disks. The remaining RAID levels store data in a interleaved manner across several data disks. One or more additional disks are utilized to store error check or parity information.

An additional disk array arrangement, referred to as parity striping, is presented in an article titled "Parity Striping of Disc Arrays: Low-Cost Reliable Storage with Acceptable Throughput" by Jim Gray, Bob Horst and Mark Walker; Tandem Computers, Inc., Tandem Technical Report No. 90.2, January 1990. In the parity striping system, only parity information is distributed across the disks, and the parity is mapped as large contiguous extents. Data is not divided among the disks but is stored in the conventional manner.

In order to coordinate the operation of the multitude of disk drives within an array to perform read and write functions, parity generation and checking, and data restoration and reconstruction, complex storage management techniques are required. In many of the disk array systems described in the prior art, the host operates as the RAID controller and performs the parity generation and checking and other storage management operations. Having the host perform these functions is expensive in host processing overhead.

In addition, most prior art systems include a fixed data path structure interconnecting the plurality of disk drives with the host system. Rearrangement of the disk array system to accommodate different quantities of disk drives or different RAID configurations is not easily accomplished.

OBJECTS OF THE INVENTION

It is therefore an object of the present invention to provide a new and improved disk array controller.

It is another object of the present invention to provide such an array controller including a variable data path between the host system and the individual disk drives included within the disk array.

It is yet another object of the present invention to provide such a disk array controller including logic for calculating and checking parity and error correcting codes.

It is a still further object of the present invention to provide a disk array controller architecture which can be configured to accommodate different quantities of disk drives.

A still further object of the present invention is to provide a new and useful disk array controller architecture which can be configured to accommodate different RAID configurations.

SUMMARY OF THE INVENTION

There is provided, in accordance with the present invention, a disk array controller for interfacing a host computer system with a plurality of disk drives. The controller directs data transmissions between a host bus connected to the host system and a plurality of drive busses associated with the individual disk drives within the disk array. The controller includes host interface means connected between the host bus and a plurality of buffer busses for transferring data between the host bus and one or more selected buffer busses. The controller further includes a bus switch connected between the buffer busses and the drive busses for coupling a group of selected buffer busses to a group of selected drive busses. The bus switch also includes a parity generator the output of which may be directed to any selected buffer or drive bus. A storage buffer is connected to the plurality of buffer busses for storing data placed on the buffer busses and placing stored data onto the buffer busses.

The controller architecture described above, under the direction of an included processor and DMA control logic, performs array read and write operations requested by the host system in accordance with RAID level 1, 3, 4 or 5 protocols.

The above and other objects, features, and advantages of the present invention will become apparent from the following description and the attached drawings.

BRIEF DESCRIPTION OF THE DRAWINGS

FIGS. 2A and 2B together provide a block diagram illustration of the logic included within Host I/F Logic block 202 shown in FIG. 1.

DETAILED DESCRIPTION OF THE PREFERRED EMBODIMENT

Figure 1A:
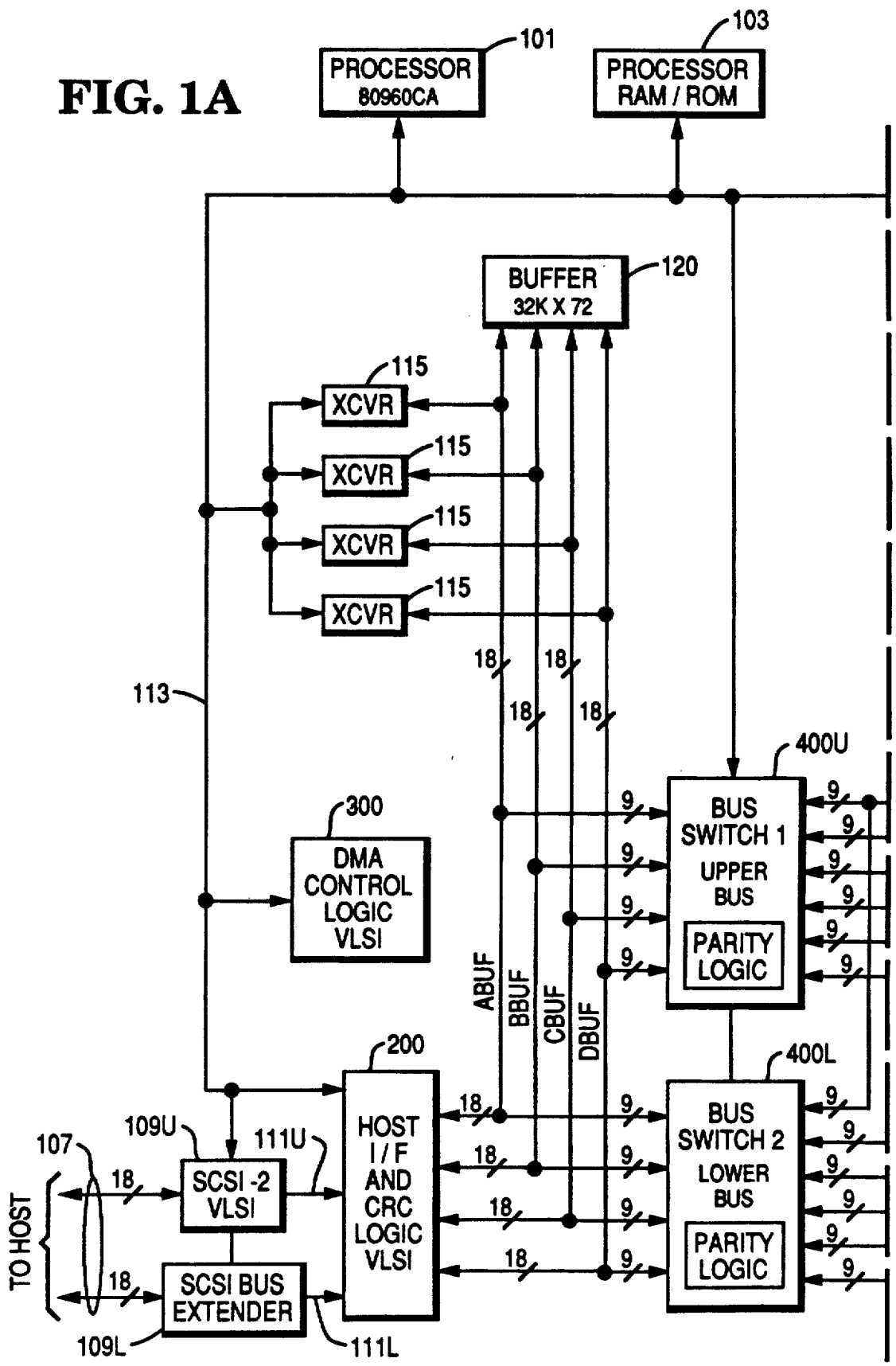
FIGS. 1A and 1B illustrate in block diagram form the architecture for a disk array controller in accordance with a preferred embodiment of the present invention.
Figure 1B:
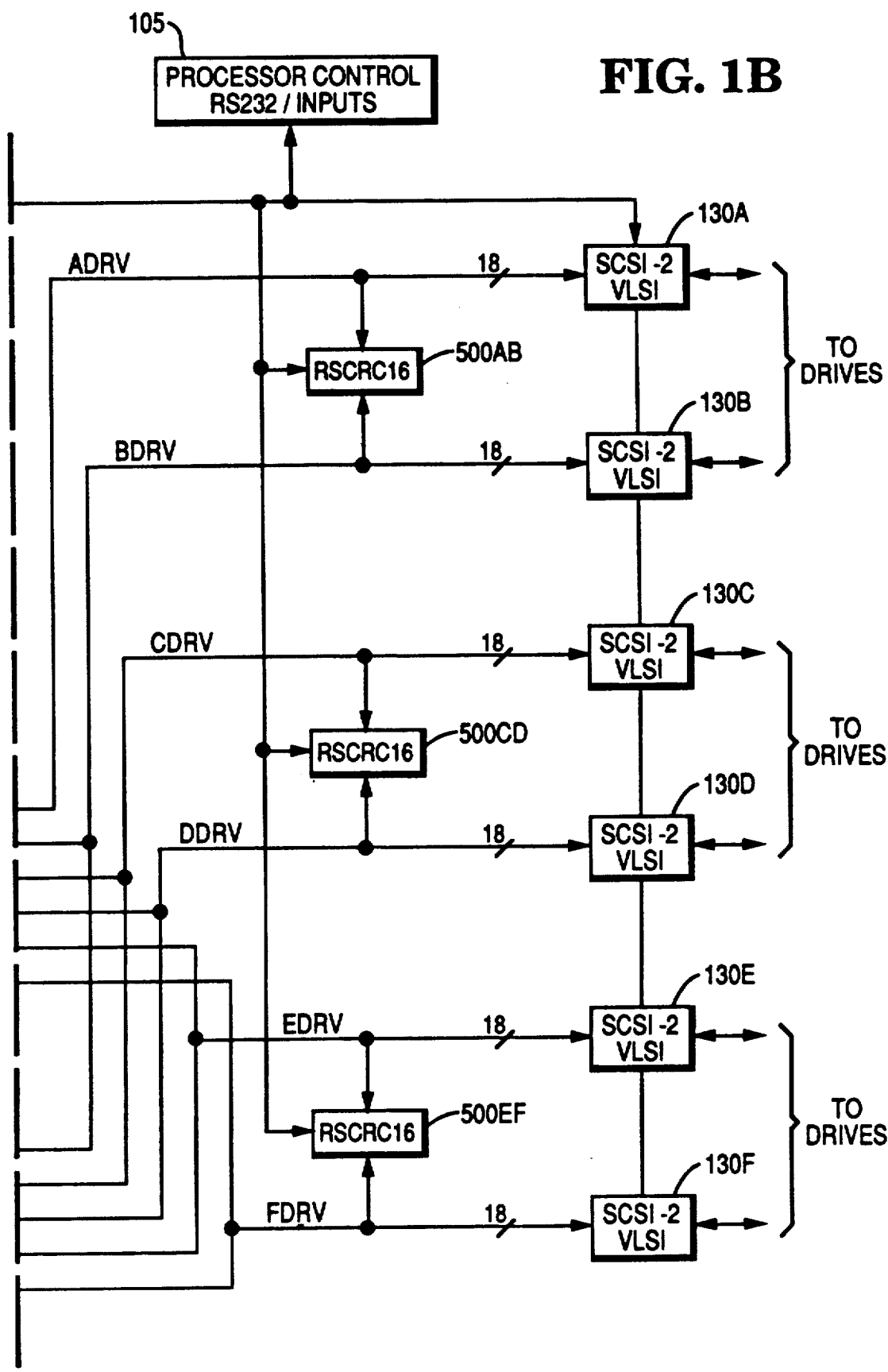

Referring now to FIG. 1, the architecture of a disk array controller representing a preferred embodiment of the present invention is shown in block diagram form. The controller exchanges data with the host computer system (not shown) through Host Interface and CRC Logic block 200. Host I/F Logic block 200, under the control of processor 101, interfaces an external 18-bit or 36-bit wide, SCSI-2 bus 107 associated with the host system with four internal 18-bit wide buffer busses ABUF, BBUF, CBUF and DBUF. Bus 107 connects to Host I/F Logic block 200 through a standard SCSI-2 chip set, represented by blocks 109U and 109L and eighteen-bit busses 111U and 111L. Interconnection between block 200 and processor 101 is provided by address/data bus 113. The internal construction and operation of block 200 will be described in greater detail below with reference to FIGS. 2A and 2B.

Internal buffer busses ABUF, BBUF, CBUF and DBUF connect Host I/F Logic block 200 with a RAM buffer 120 and upper and lower byte bus switches 400U and 400L. Buffer 120 possesses the capability to read and write 72-bit wide words from the four buffer busses, or individual 18-bit wide words from any one of the buffer busses. Eighteen or 36-bit access is also provided through transceivers 115 to bus 113.

Bus switches 400U and 400L provide variable bus mapping between buffer busses ABUF, BBUF, CBUF and DBUF and six 18-bit wide drive busses labeled ADRV, BDRV, CDRV, DDRV, EDRV and FDRV, each switch providing routing for one byte (eight bits data and one bit parity) of information. Bus switches 400U and 400L further include the capability to generate parity information, which may be directed onto any of the buffer or drive busses, check parity information and reconstruct information stored on a failed disk drive. FIGS. 4 through 7, discussed below, provide greater detail concerning the construction and operation of bus switches 400U and 400L.

Each one of drive busses ADRV, BDRV, CDRV, DDRV, EDRV and FDRV is connected to an associated SCSI-2 device, labeled 130A through 130F, which provide connection to six corresponding disk drives (not shown) forming the disk array. The six drives will be identified herein as drives A through F. 16-bit Reed-Solomon Cyclic Redundancy Check (RSCRC16) logic blocks 500AB, 500CD and 500EF are connected between busses ADRV and BDRV, CDRV and DDRV, and EDRV and FDRV, respectively, to provide error detection and generation of Reed-Solomon CRC for the array controller. The RSCRC16 logic, shown in FIGS. 8A and 8B, is discussed in more detail below.

Figure 3A:
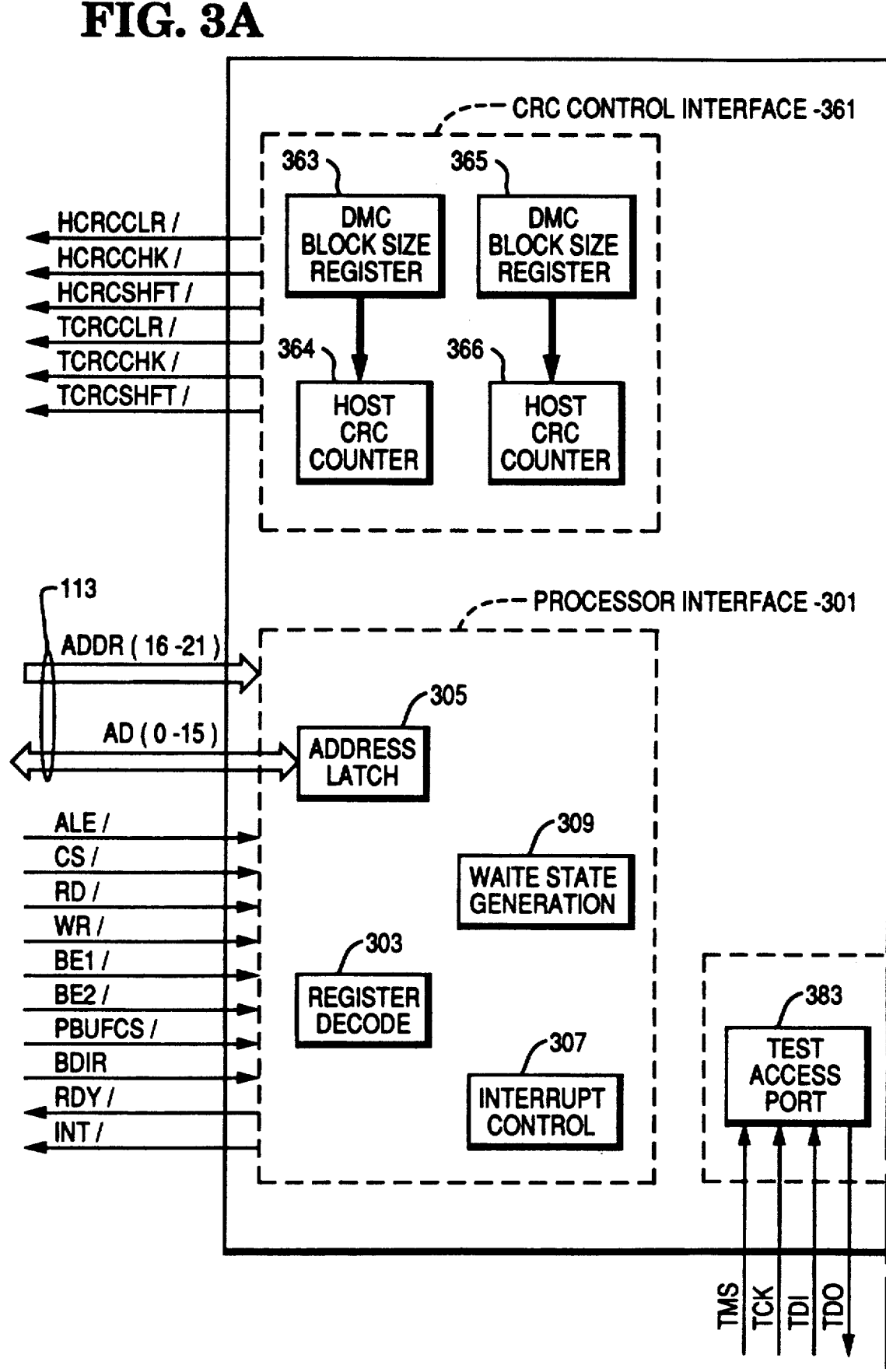
FIGS. 3A and 3B together provide a block diagram illustration of the logic included within DMA Control Logic block 300 shown in FIG. 1.
Figure 3B:
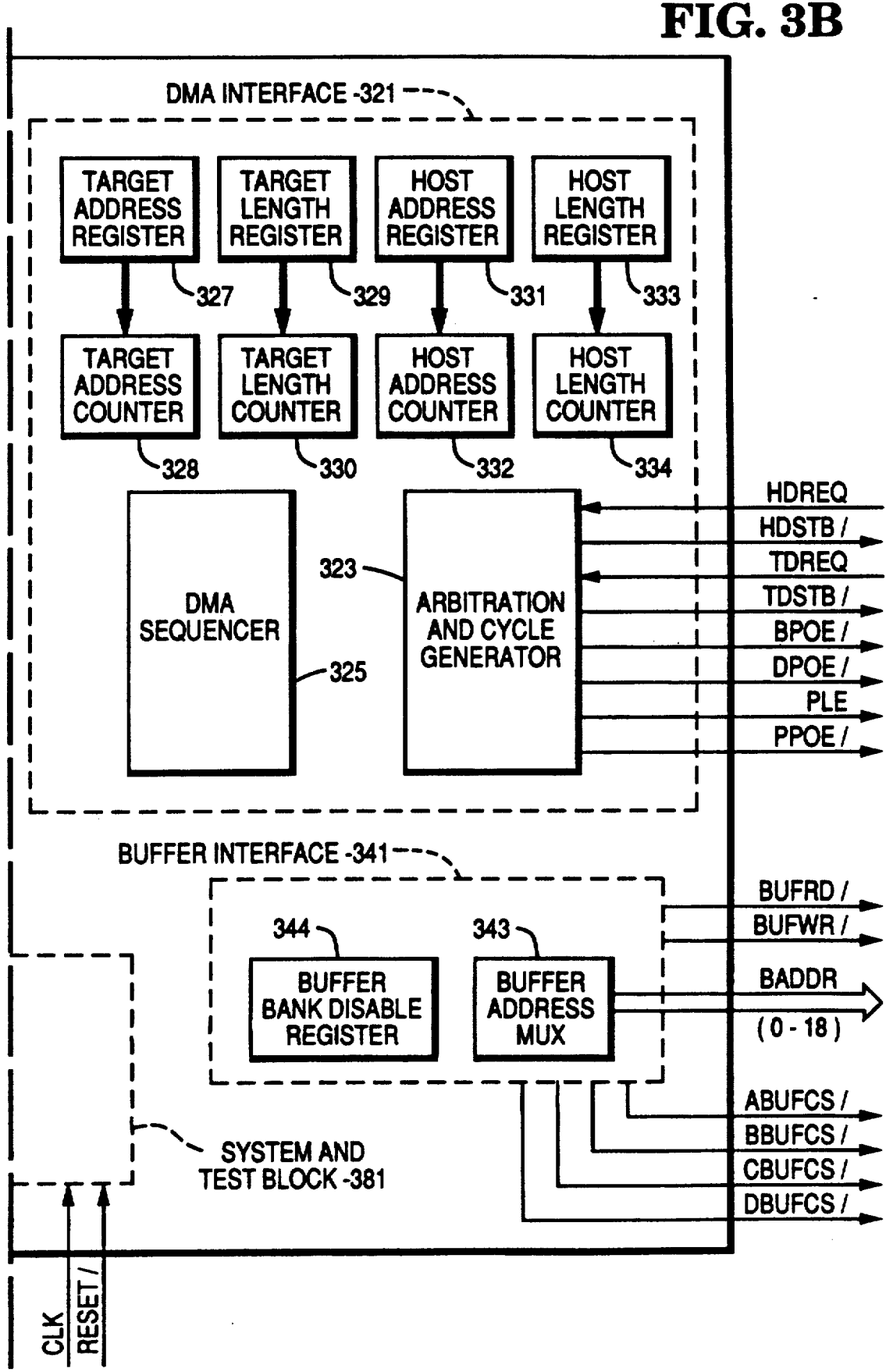

The control of Host I/F Logic block 200; bus switches 400U and 400L; RSCRC16 logic blocks 500AB, 500CD and 500EF; and SCSI devices 109U, 109L, and 130A through 130F is provided by microprocessor 101. Communication between microprocessor 101, associated processor memory 103 and processor control inputs 105 and the above-identified elements is provided by address/data bus 113. Also shown connected to bus 113 is DMA Control Logic block 300. The logic within block 300, shown in detail in FIGS. 3A and 3B, provides DMA control for Host I/F Logic block 200, bus switches 400U and 400L, SCSI-2 devices 130A through 130F and processor 101.

Descriptions of the logic included within, and operation of, Host I/F Logic block 200, DMA Control Logic block 300 bus switches 400U and 400L, and RSCRC16 logic blocks 500AB, 500CD and 500EF now follows.

Figure 2B:
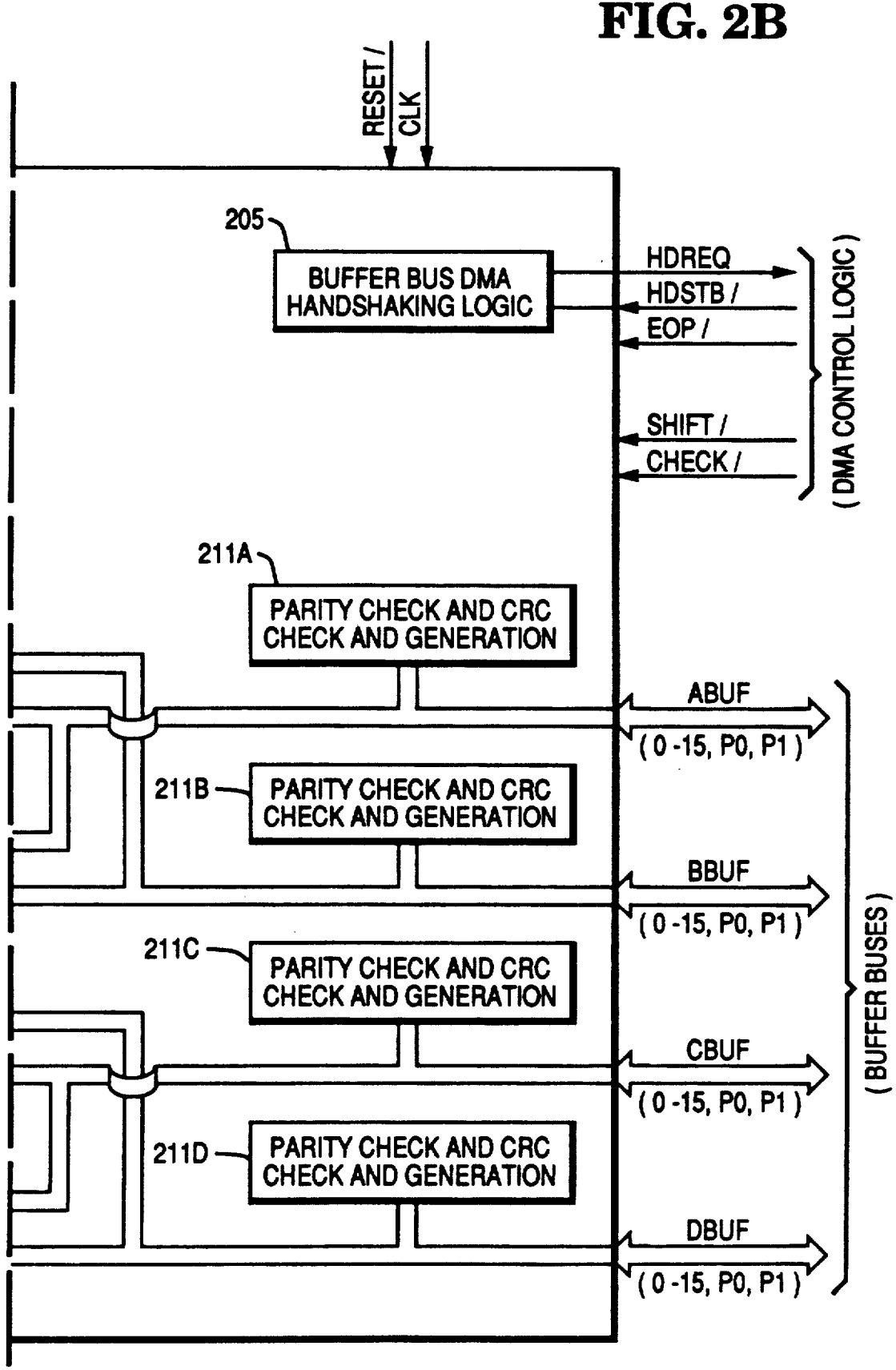

FIGS. 2A and 2B together provide a block diagram illustration of the logic included within Host I/F Logic block 200 shown in FIG. 1. The Host I/F Logic block includes six major types of internal logic blocks: control and status registers 201, SCSI-2 DMA bus handshaking logic 203, buffer bus DMA handshaking logic 205, FIFO blocks 207A through 207D, parity check blocks 209U and 209L, and parity check and CRC generation blocks 211A through 211D.

Control and status register block 201 contains several 16-bit control registers utilized to configure, control and reset the functions of Host I/F Logic block 200. Block 201 also includes status registers used by controller microprocessor 101 to determine the state of the Host I/F Logic block. Microprocessor access to the control and status registers within block 201 is provided by multiplexed address/data bus AD(0-7), data bus D(8-15), and various control lines for transmitting chip select signal CS/, read signal RD/, write signal WR/, address latch enable signal ALE and interrupt signal INT/. Busses AD(0-7) and D(8-15) are included within address/data bus 113, shown in FIG. 1.

Block 203 contains the SCSI-2 DMA bus handshaking logic necessary to effectuate DMA transfers between Host I/F Logic block 200 and SCSI-2 device 109U. The handshaking logic also controls the multiplexing and demultiplexing of data between SCSI devices 109U and 109L and FIFOs 207A through 207D. Block 203 also modulates request/acknowledge handshaking depending upon the empty or full status of the FIFOs. Buffer bus DMA handshaking logic 205 contains similar handshaking logic for controlling DMA transfers between the Host I/F Logic block and an external buffer bus controller.

The four FIFO blocks 207A through 207D are utilized to eliminate any handshaking dependencies between the Host I/F Logic block and buffer busses ABUF, BBUF, CBUF and DBUF. FIFO blocks 207A and 207B are each connected between bus 111U and buffer busses ABUF and BBUF. FIFO blocks 207C and 207D are each connected between bus 111U and buffer busses CBUF and DBUF. If the controller architecture includes SCSI bus extender device 109L and associated bus 111L, blocks 207B and 207D are also connected to bus 111L. The configuration and operation of the FIFO blocks are controlled by registers within block 201.

Each FIFO block can store up to four eighteen bit words (sixteen bits of data and two bits of parity).

Blocks 209U and 209L provide parity check for all information transmitted between the Host I/F Logic block and SCSI-2 devices 109U and 109L, respectively. These blocks generate parity information for the data transfers and compare the generated parity information with the parity information transmitted with the data.

Blocks 211A through 211D provide a parity check for data transfers between the Host I/F Logic block and respective buffer busses. Blocks 211A through 211D also function to generate and append CRC data to DMA data blocks, and to check and remove appended CRC data from DMA data blocks.

In operation Host I/F Logic block 200 is used to multiplex data between SCSI-2 devices 109U and 109L and the four buffer busses ABUF, BBUF, CBUF and DBUF. Block 200 provides multiplexing functionality between busses 111U and 111L and (1) all four buffer busses for 4+1 RAID level 3 applications by word striping data across the four buffer busses in a rotating sequential order, (2) one of two defined pairs of buffer busses for 2+1 RAID level 3 applications by word striping data across the pair of buffer busses in a rotating sequential order, of (3) any one of the buffer busses for RAID level 1 and single bus RAID level 5 applications.

FIGS. 3A and 3B together provide a block diagram illustration of the logic included within DMA Control Logic block 300 shown in FIG. 1. DMA Control Logic block 300 is divided into four major sections: microprocessor interface 301, DMA Interface 321, Buffer Interface 341 and CRC Control Interface 361.

Microprocessor Interface 301 includes various interface circuits designed to perform the following functions: internal register read and write control (block 303), address latching and decoding (block 305), microprocessor data bus control, interrupt generation and control (block 307), and wait state generation for buffer accesses (block 309). Microprocessor access to block 301 is provided by multiplexed address/data bus AD(-0-15), address bus ADDR(16-21), and various control lines for transmitting address latch enable signal ALE/, chip select signal CS/, read signal RD/, write signal WR/, buffer enable signals BE1/ and BE2/, buffer chip select signal PBFCS/, buffer direction signal BDIR, ready signal RDY/, and interrupt signal INT/. Busses AD(0-15) and ADDR(16-21) are included within address/data bus 113, shown in FIG. 1.

DMA Interface 321 contains all the circuitry necessary to interface to Host I/F Logic block 200 and to drive SCSI-2 devices 130A through 130F via bus switches 400U and 400L. The DMA Interface performs the following functions: arbitration between active DMA channels (block 323), generation of DMA cycle signals, and performing DMA linking. Communication with block 321 is provided through control lines for transmitting host DMA request signal HDREQ, host DMA strobe signal HDSTB/, target DMA request signal TDREQ, target DMA strobe signal TDSTB/, bus switch output enable signal BPOE/ and DPOE/, processor latch enable signal PLE/, and processor port output output enable signal PPOE/.

Buffer interface 341 contains circuitry which interfaces block 300 with RAM buffer 120. Interface 341 supports the following functions: addressing for up to four megabytes of buffer address space, control of buffer read and write operations, and control of buffer chip selection for each DMA channel. Communication with buffer interface 341 is provided by buffer address bus BADDR(0-18) and control lines for transmitting buffer read and write signals BUFRD/ and BUFWR/, and buffer chip select signals ABUFCS/, BBUFCS/, CBUFCS/ and DBUFCS/.

CRC Control Interface 361 provides control for external CRC generators and checkers. Interface 361 provides a reset signal to initialize external CRC chips and enables external CRC checking and generation. Communication with interface 361 is provided by control lines for transmitting host clear, check and shift signals HCRCCLR/, HCRCCHK/ and HCRCSHFT/, and target clear, check and shift signals TCRCCLR/, TCRCCHK/ and TCRCSHFT/.

DMA Control Logic block 300 also includes system and test block 381 which provides timing, reset and test functions for block 300.

In operation the DMA Control Logic block provides DMA and buffer control for the Host I/F Logic block 200, bus switches 400U and 400L, SCSI-2 devices 130A through 130F and processor 101. The DMA Control Logic block communicates with microprocessor 101 as a peripheral device. It is controlled by reading and writing internal registers. The logic supports the following types of data transfers: host read (buffer 120 data sent to SCSI host), host write (data received from host written into buffer 120), target read (data read from drive array written into buffer 120), target write (buffer 120 data written to drive array), direct write (data received from SCSI host sent to drive array with no buffering), direct read (data read from drive array sent to SCSI host without buffering), processor read and processor write.

Figure 4:
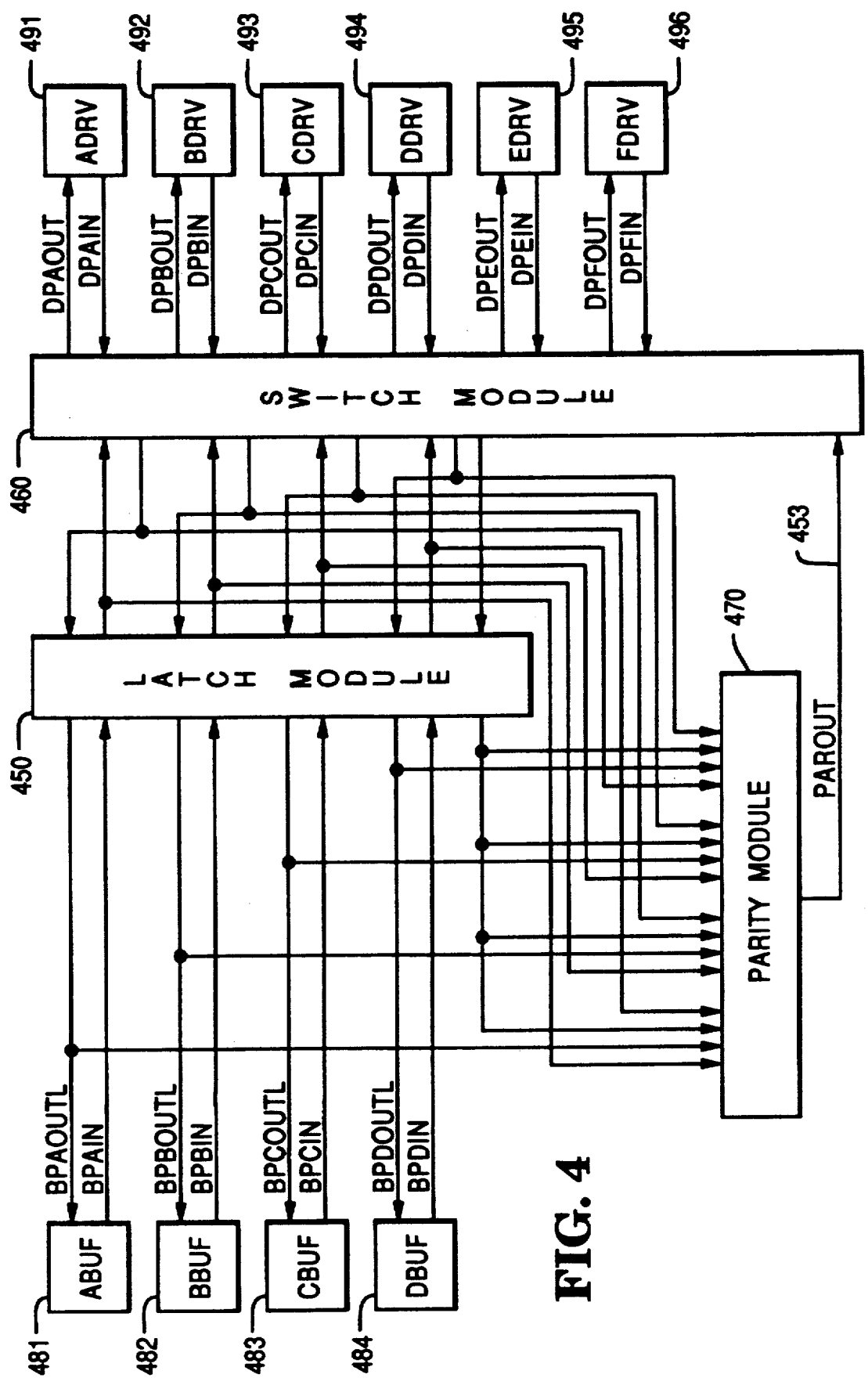
FIG. 4 is a block diagram illustration of the logic included within Bus Switch block 400U shown in FIG. 1.

The logic included within bus switch 400 is shown in the block diagram of FIG. 4. The structure shown is formed upon a single semiconductor chip. The four host ports, labeled 481 through 484, provide connection to the four controller busses ABUF, BBUF, CBUF and DBUF, respectively. The array ports, identified by reference numerals 491 through 496, connect with the six disk drive busses ADRV, BDRV, CDRV, DDRV, EDRV and FDRV, respectively. Bus switch 400 provides a unidirectional connection between any one of controller buses ABUF, BBUF, CBUF and DBUF and any one of drive buses ADRV, BDRV, CDRV, DDRV, EDRV and FDRV. Multiple connections between several controller busses and an equal number of drive busses is also permitted. Additionally, the bus switch may provide unidirectional connection of any controller bus to two or more drive busses. Parity information obtained via bus 453 can also be ported to any one of the drive busses.

Figure 5:
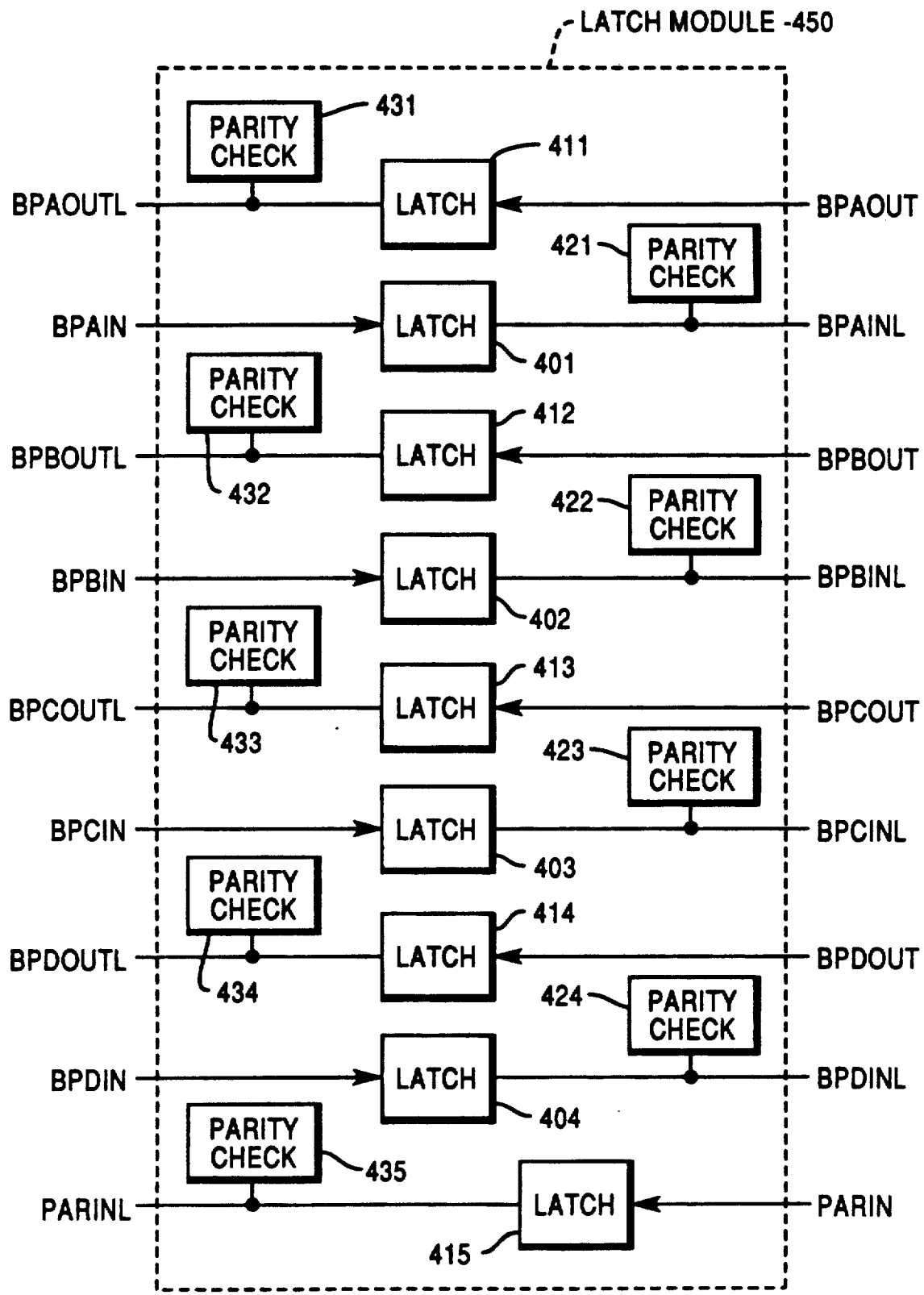
FIG. 5 is a block diagram illustration of the latch module shown in FIG. 4.

The architecture of bus switch 400 is composed of three primary blocks: a latch module 450, switch module 460, and a parity module 470. The internal structures of latch module 450, switch module 460 and parity module 470 are revealed in FIGS. 5, 6 and 7, respectively. Referring to FIG. 5, latch module 450 is seen to comprise four latches, identified by reference numerals 401 through 404, connected to receive data from busses BPAIN, BPBIN, BPCIN and BPDIN, respectively, and provide latched data to switch module 460 via busses BPAINL, BPBINL, BPCINL and BPDINL, respectively.

Latch module 450 further includes five bus latches 411 through 415 connected to receive data from switch module 460 via busses BPAOUT, BPBOUT, BPCOUT, BPDOUT and PARIN, respectively. The outputs of latches 411 through 414 are provided to busses BPAOUTL, BPBOUTL, BPCOUTL and BPDOUTL, respectively. The output of latch 415 is connected via bus PARINL to parity module 460.

Latches 401 through 404 and 411 through 415 are responsive to control signals generated by the controller to latch or pass received data. Also shown in FIG. 5 are parity check circuits, identified by reference numerals 421 through 424 and 431 through 435, connected to the outputs of each of the latches. Each one of the parity check circuits generates an error signal whenever a parity error is detected.

Figure 6A:
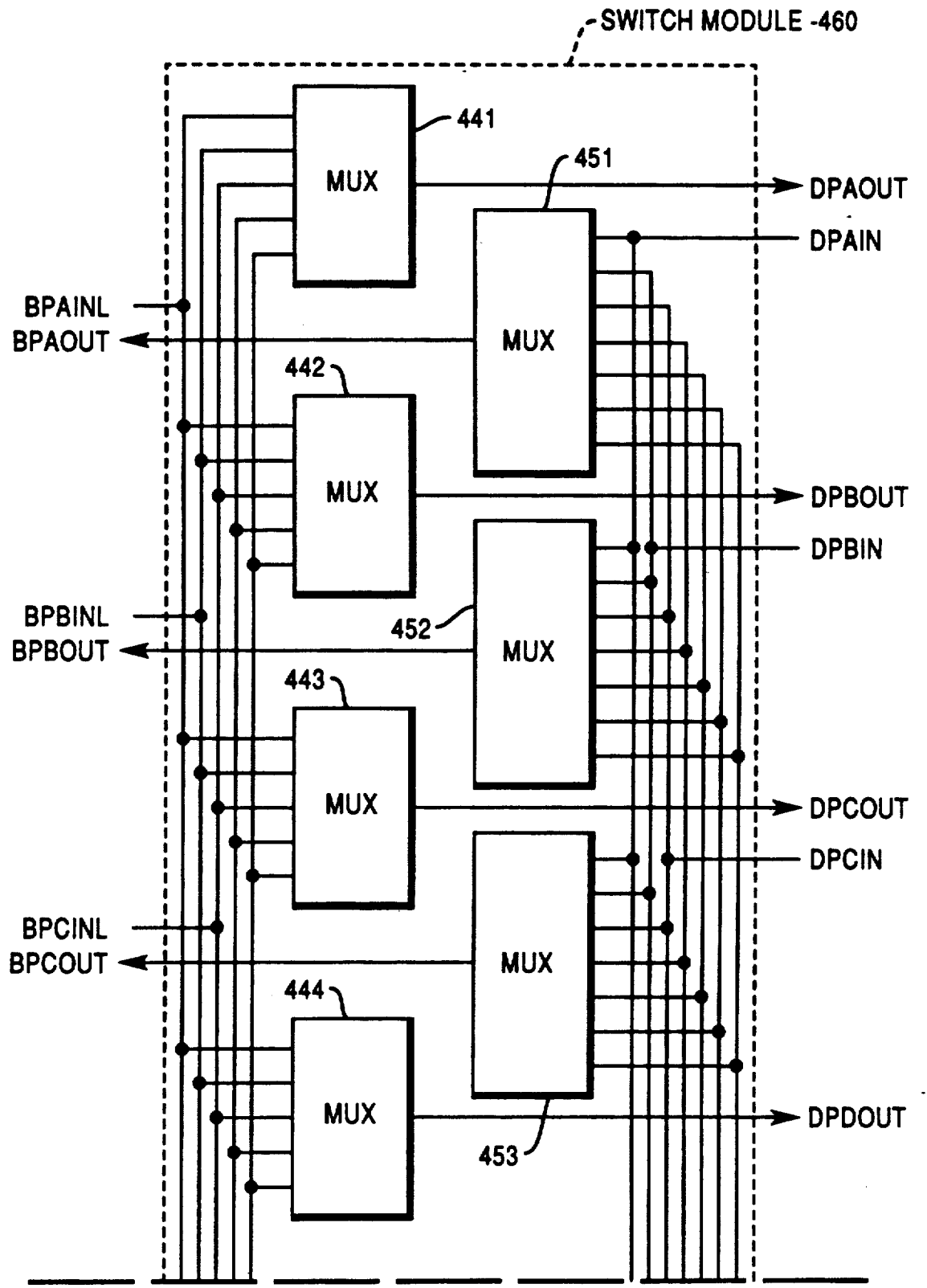
FIGS. 6A and 6B illustrate in block diagram form the internal structure of the switch module shown in FIG. 4.
Figure 6B:
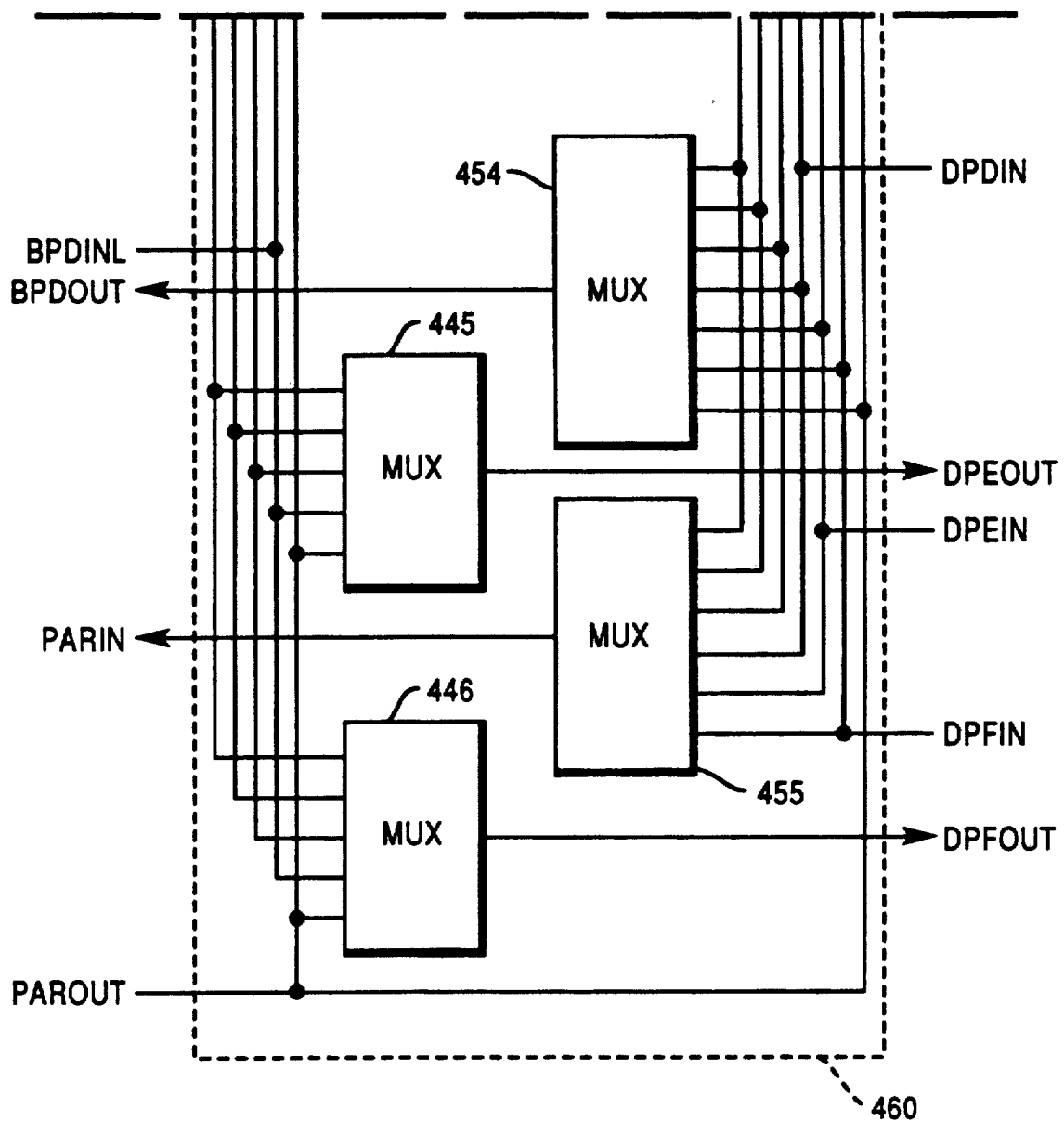

FIGS. 6A and 6B provide a block diagram illustration of the internal structure of switch module 460 shown in FIG. 4. Module 460 includes six 5:1 multiplexers 441 through 446. The corresponding inputs of each multiplexer are connected to busses BPAINL, BPBINL, BPCINL, BPDINL and PAROUT, the output of parity module 470. The outputs of multiplexers 441 through 446 are connected to busses DPAOUT, DPBOUT, DPCOUT, DPDOUT, DPEOUT and DPFOUT, respectively.

Switch module 460 further includes four 7:1 bus multiplexers identified by reference numerals 451 through 454. The corresponding inputs of each one of multiplexers 451 through 454 are connected to busses DPAIN, DPBIN, DPCIN, DPDIN, DPEIN, DPFIN and PAROUT. The inputs of a 6:1 multiplexer 455 are also connected to busses DPAIN, DPBIN, DPCIN, DPDIN, DPEIN and DPFIN The outputs of multiplexers 451 through 455 are connected to busses BPAOUT, BPBOUT, BPCOUT, BPDOUT and PARIN, respectively.

Each one of multiplexers 441 through 446 are responsive to select signals generated by the controller to couple any one of busses BPAINL, BPBINL, BPCINL, BPDINL and PAROUT to the multiplexer's corresponding output bus. Similarly, each one of multiplexers 451 through 455 are responsive to select signals generated by the controller to couple any one of busses DPAIN, DPBIN, DPCIN, DPDIN, DPEIN, DPFIN and PAROUT to the bus connected to the multiplexer's output.

Figure 7:
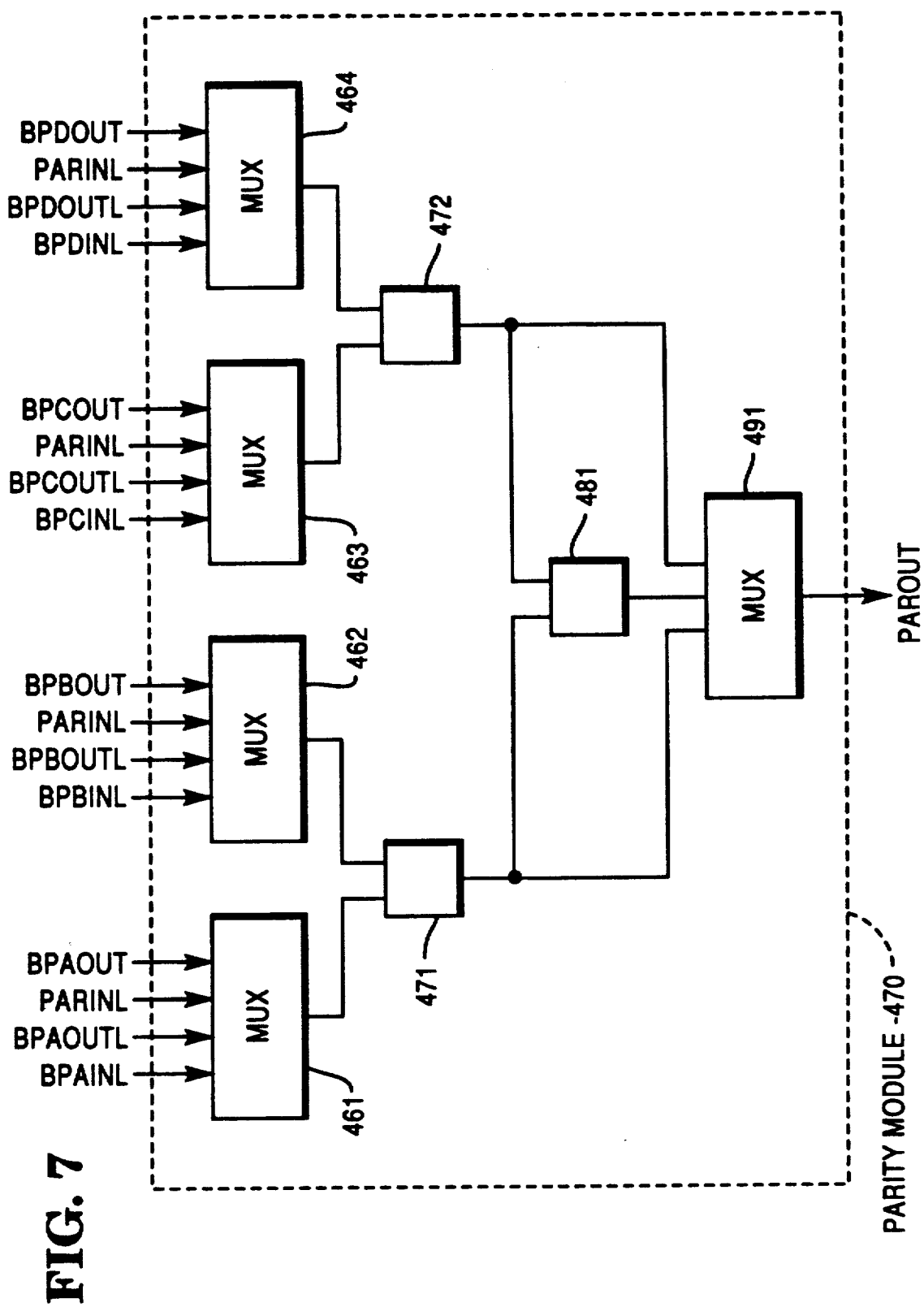
FIG. 7 is a block diagram illustration of the parity module shown in FIG. 4.

The internal structure of parity module 470 is illustrated in the block diagram of FIG. 7. Module 470 includes four 4:1 multiplexers 461 through 464. Multiplexer 461 is connected to receive data from busses BPAINL, BPAOUTL, PARINL and BPAOUT; multiplexer 461 is connected to receive data from busses BPBINL, BPBOUTL, PARINL and BPBOUT; multiplexer 161 is connected to receive data from busses BPCINL, BPCOUTL, PARINL and BPCOUT; and multiplexer 461 is connected to receive data from busses BPDINL, BPDOUTL, PARINL and BPDOUT.

Parity information is calculated and checked, and drive data is reconstructed by performing a bit-wise exclusive-OR of selected busses. Module 470 includes a first exclusive-OR circuit 471 for combining the outputs of multiplexers 461 and 462, a second exclusive-OR circuit 472 connected to combine the outputs of multiplexers 463 and 464, and a third exclusive-OR circuit 475 for combining the outputs of exclusive-OR circuits 471 and 472. The output of parity module 470 is provided by a 3:1 multiplexer 479 connected to receive the outputs of the three exclusive-OR circuits. The output of multiplexer 479 is provided to bus switch 460 which can then direct the parity data to any controller or drive bus as described above.

Multiplexers 461 through 464 are responsive to select signals generated by the controller to couple selected data busses into exclusive-OR circuits 471 and 472. Multiplexer 479 is responsive to select signals generated by the controller to limit the number of busses involved in an exclusive-OR operation. For example, data from four busses may be combined to generate parity during RAID level 3, 4 or 5 write operations, but data from only two busses need be combined to check data saved in an array configured in accordance with RAID level 1.

Figure 8:
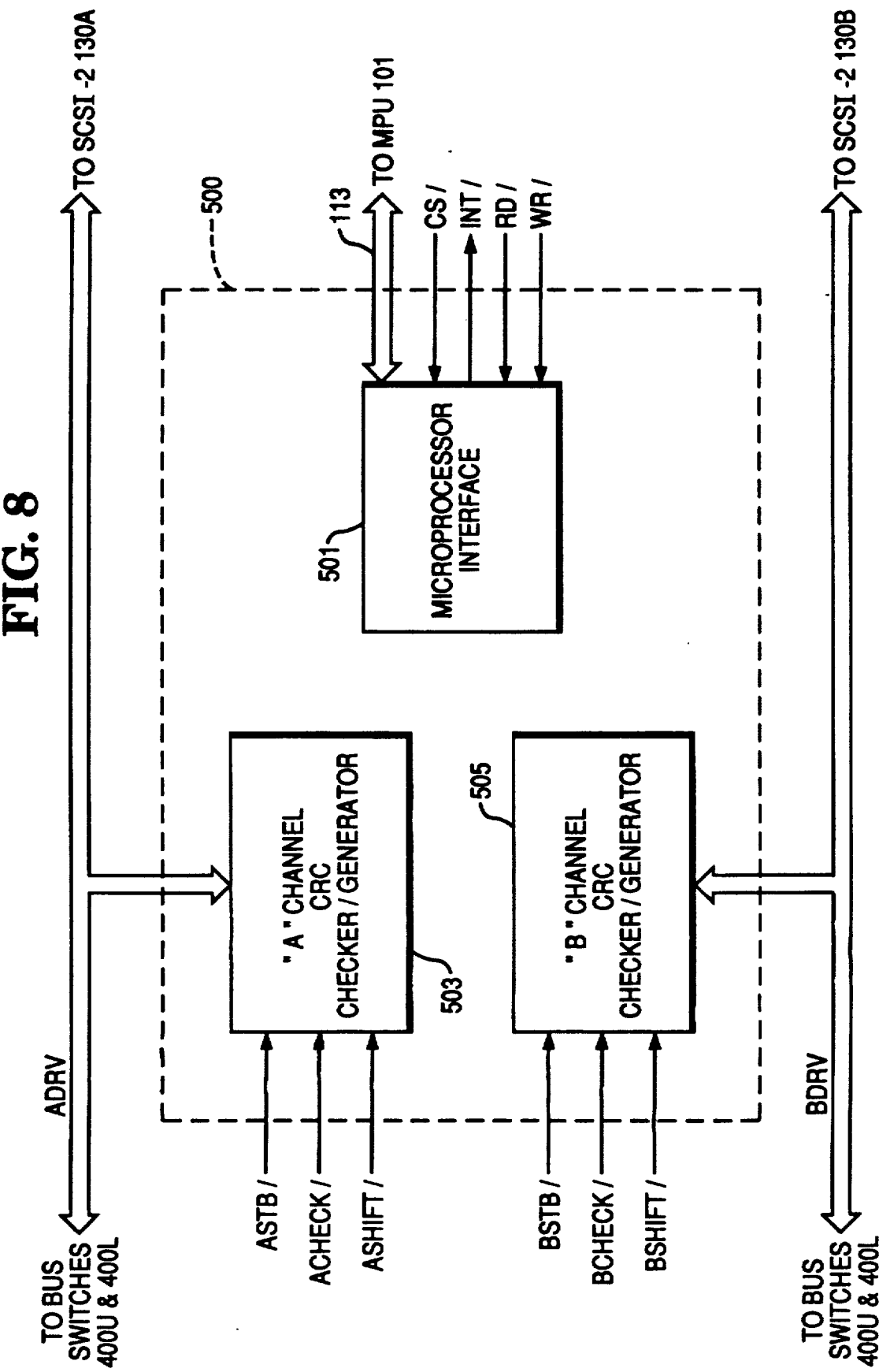
FIG. 8 is a block diagram illustration of the logic included within Reed-Solomon Cyclic Redundancy Check (RSCRC16) block 500AB shown in FIG. 1.

FIG. 8 provides a block diagram illustration of the logic included within Reed-Solomon Cyclic Redundancy Check (RSCRC16) blocks 500AB shown in FIG. 1. RSCRC16 block 500AB supports error checking for data transfers on drive busses ADRV and BDRV. The block includes three major sections: microprocessor interface 501, ADRV bus RSCRC16 Checker/Generator 503 and BDRV bus RSCRC16 Checker/Generator 505.

Microprocessor Interface 501 includes various interface circuits designed to perform the following functions: internal register read and write control, address latching and decoding, and interrupt generation and control. Microprocessor access to block 501 is provided by multiplexed address/data bus 113 and lines for transmitting control signals including chip select signal CS/, interrupt signal INT/, and read and write signals RD/ and WR/.

Figure 9:
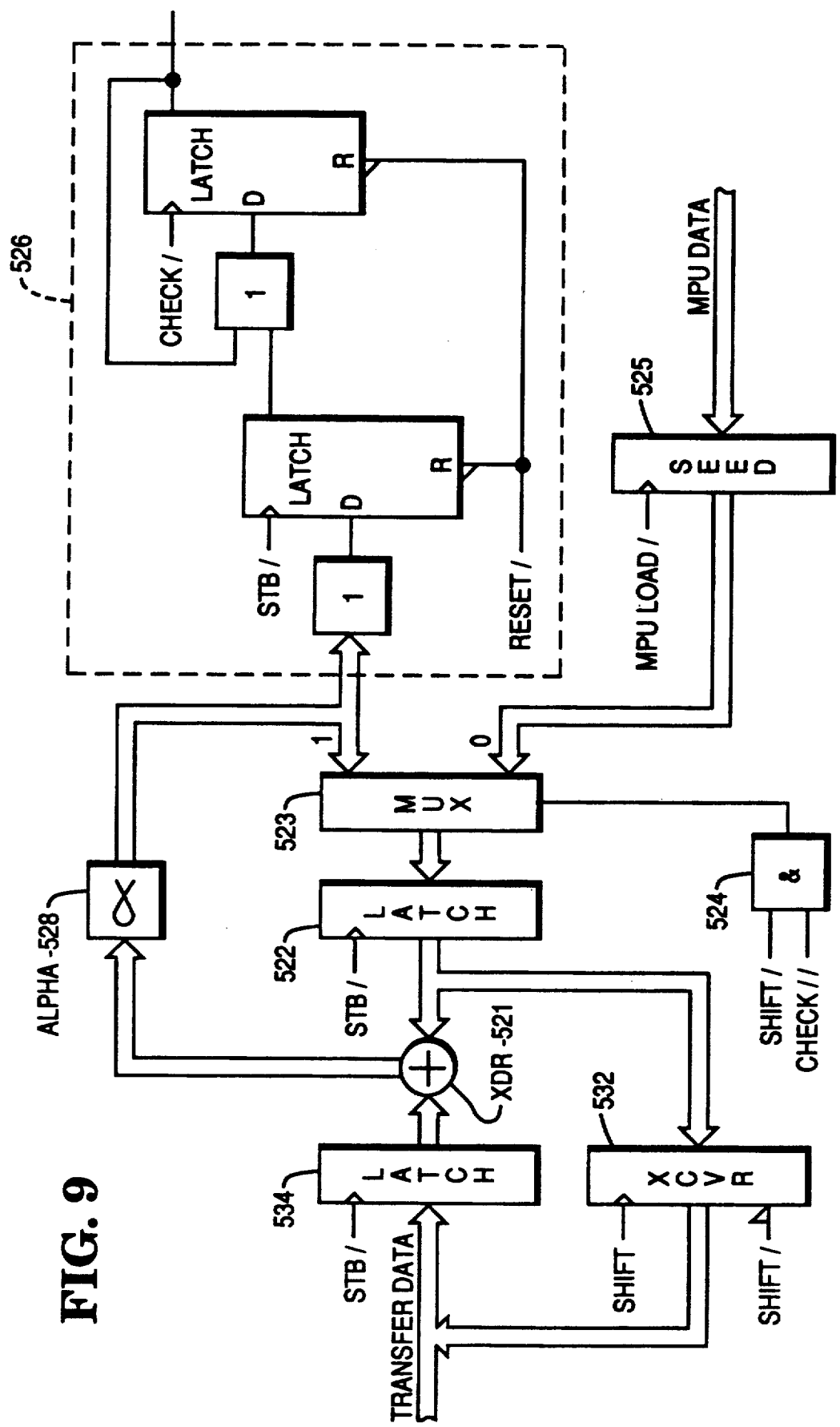
FIG. 9 is a block diagram illustration of RSCRC16 Generator/Checker module 503 shown in FIG. 8.

RSCRC16 Generator/Checker modules 503 and 505 perform error checking for busses ADRV and BDRV, respectively. Each module is connected to receive data from its corresponding drive bus, strobe signals ASTB/ and BSTB/ from respective drive interfaces 491 and 492, and check signals ACHECK/ and BCHECK/ and shift signals ASHIFT/ and BSHIFT/ from CRC Control Interface 361. A block diagram illustration of the RSCRC16 Generator/Checker module is shown in FIG. 9. Modules 503 and 505 are identical.

The RSCRC16 Generator/Checker module includes an exclusive-OR circuit 521 connected to receive data from a data-in latch 534, containing data received from the module's corresponding drive bus, and accumulator latch 522. Accumulator latch 522 may be loaded with either seed data provided by the controller microprocessor or with feedback data obtained from an alpha multiplier 528. The output of exclusive-OR circuit 521 forms the input to alpha multiplier 528.

Operation of the RSCRC16 Generator/Checker module of FIG. 9 is as follows: (1) Seed data is loaded into seed latch 525 from address/data bus 113. This seed value is selected to create specific error detection code (EDC) characteristics. (2) Input data appearing on the drive bus is latched into data-in latch 534 and feed data is latched into accumulator latch 522. (3) The data in latch 522 is exclusive-ORed (XORed) with the data in latch 534 and the result provided to alpha multiplier 528. (4) Alpha multiplier 528 contains a set of asynchronous logic that performs an arithmetic multiplication of the incoming data by a predefined fixed number. (5) The output of alpha multiplier 528 is latched into accumulator latch 522.

The process of steps 2 through 4 is repeated until data transfer on the drive bus has been completed. When in the generate mode of operation, the last value latched into accumulator latch 522 is provided via transceiver 532 to the drive bus for storage with the transferred data. When in the check mode, the final output of alpha multiplier 528 is checked for an all zero condition indicating that no error was detected. Logic 526 performs the zero detect operation.

The controller architecture shown in the FIGURES and described above provides a versatile connection between a host system and an array of disk drives. The unique combination of data switching and data manipulation components included within the controller architecture permits data storage and retrieval operations in accordance with RAID levels 1, 3, 4 or 5. In addition, operations including error recovery, data regeneration of information stored on a failed drive, and data reconstruction onto a spare drive are supported.

A discussion of some of the operations described above now follows.

RAID level 3, 4+1 (four data disks and one parity disk) write operations are performed as follows: Data received from the host system via bus 107 is divided into eighteen-bit words (sixteen bits of data and two bits of parity information), multiplexed by host interface 200 unto buffer busses ABUF, BBUF, CBUF and DBUF, and written into buffer 120. Upon removal from buffer 120, bus switches 400L and 400U route the data to four of the drive busses, e.g. busses ADRV, BDRV, CDRV and DDRV. The bus switches also calculate parity information by performing a bitwise exclusive-OR of the information received from the four buffer busses. The calculated parity information is routed to disk drive E via bus EDRV. The sixth disk drive, drive F, is reserved as a spare drive.

RAID level 3 read operations are performed by reading data from the four data drives, i.e. drives A through D, via drive busses ADRV, BDRV, CDRV and DDRV. The data is provided through bus switches 400L and 400U and buffer busses ABUF, BBUF, CBUF and DBUF to buffer 120. In a separate operation, data is read from the buffer and sent to host interface 200 which converts the sixty-four bits of data received into sixteen or thirty-two bit (excluding parity information) form for transmission to the host system. Corresponding information from parity drive E may be read and exclusive-ORed (XORed) within the bus switches with the data read from the data drives to perform a parity check of the data read from drives A through D.

Data which is inaccessible due to a failure of one of the disk drives can be regenerated during the read operation. For example, if drive C has failed, the data read from data drives A, B and D may be combined within the bus switch parity logic modules with the parity information obtained from drive E to regenerate the drive C data. The regenerated data is placed onto buffer bus CBUF and together with the data from drives A, B and D placed on buffer busses ABUF, BBUF and DDUF, respectively, provided to buffer 120 and ultimately to host interface 200 for conversion and transmission to the host system. Alternatively, the controller architecture could be configured to provide the regenerated data to spare drive F.

RAID level 5 write operations involve both a read and a write procedure. The data paths must first be configured to read old data and old parity information from the target data and parity disk drives. The old data and parity information is XORed together within the bus switch parity logic modules and the result provided via a selected buffer bus to storage buffer 120. During this operation the new data received from the host system is also written to buffer 120. The data paths are then configured to provide the new data and XORed result stored in buffer 120 to the bus switches. The new data is routed to the target data drive. New parity is generated by XORing the new data and XOR result received from buffer 120 and routed to the parity drive.

RAID level 5 read operations performed by reading data from the drive containing the requested data and routing the data through the bus switches and host interface onto bus 107. For example, if the requested data is stored in drive B, the controller architecture is configured to create a data path connecting drive A through bus BDRV, bus switches 400U and 400L, buffer bus BBUF and host I/F 200 to host bus 107. If the data requested is inaccessible because of a failure of the disk drive containing the data, i.e. drive B, it can be regenerated during the read operation by reading the data and parity information from corresponding locations on the remaining drives, drives A, C, D and E, into the bus switch parity logic modules. The regenerated data, i.e. the XOR output of the parity modules, is provided via buffer bus BBUF (an arbitrary selection) to buffer 120 and thereafter to host I/F 200 and bus 107.

Two independent RAID level 5 read-modify-write operations can be performed somewhat concurrently by the described controller architecture as long as the two operations require access to different data and parity drives. The data paths must first be configured to read old data and old parity information from the target data and parity disk drives. The old data and parity information and new data received from the host is XORed together within the bus switch parity logic modules and the result, i.e. the new parity information, provided via a selected buffer bus to storage buffer 120. During this operation the new data received from the host system is also written to buffer 120. Data and parity information for a second write is also written to buffer 120 in the manner described above. To complete the read-modify-write operation the data paths are configured to provide the new data and parity information stored in buffer 120 through the bus switches to the target data and parity drives.

It can thus be seen that there has been provided by the present invention a new and useful disk array controller architecture which is readily configured to accommodate different quantities of disk drives or different RAID configurations. The controller performs striping operations, parity generation and checking, error correction code generation and checking, and other storage management operations, freeing the host system processor from these functions.

Although the presently preferred embodiment of the invention has been described, it will be understood that various changes may be made within the scope of the appended claims.

What is claimed is:

1. A controller for interfacing a host computer system bus with a plurality of disk drive busses associated with a RAID disk array, comprising:
   a plurality of buffer busses;
   a host interface connected between said host computer system bus and said plurality of buffer busses and responsive to a first configuration control signal for selecting buffer busses based on a disk array RAID level configuration associated with said disk array and transferring data between said host computer system bus and the selected buffer busses;
   a plurality of bus switches connected between said plurality of buffer busses and said plurality of disk drive busses and responsive to a second configuration control signal for selecting disk drive busses based on the disk array RAID level configuration of said disk array and transferring data between the selected buffer busses and the selected disk drive busses; and control means responsive to instructions received form a host system for generating said first and second configuration control signals.

2. A controller for interfacing a host computer system bus with a plurality of disk drive busses associated with a disk array, comprising:

a plurality of buffer busses;

a host interface connected between said host computer system bus and said plurality of buffer busses and responsive to a first configuration control signal for selecting buffer busses based on a configuration of said disk array and transferring data between said host computer system bus and at least one buffer bus selected from said plurality of buffer busses; and a bus switch connected between said plurality of buffer busses and said plurality of disk drive busses and responsive to a second configuration control signal for selecting drive busses based on the configuration of said disk array and coupling said selected buffer busses to said selected disk drive busses; and control means responsive to instructions received from a host system for generating said first and second configuration control signals.

3. The apparatus according to claim 2, further comprising:

buffer storage connected to said plurality of buffer busses for storing data received from said buffer busses and placing stored data unto said buffer busses.

4. The apparatus according to claim 3, wherein said host interface includes:

multiplexing means for directing data between said host computer system bus and said buffer busses.

5. The apparatus according to claim 4, wherein said bus switch comprises:

a first plurality of bus multiplexers consisting of a first bus multiplexer corresponding to each one of said plurality of disk drive busses, each one of said first multiplexers having an output connected to its corresponding bus and having a plurality of inputs, each one of said inputs being connected to a corresponding one of said plurality of buffer busses.

6. The apparatus according to claim 5, wherein said bus switch further comprises:

a parity generation circuit having a plurality of inputs, each one of said parity generation circuit inputs being connected to a corresponding one of said plurality of buffer busses; and wherein each one of said first plurality of bus multiplexers has an input connected to the output of said parity generation circuit.

7. The apparatus according to claim 5, wherein said bus switch further comprises:

a second plurality of bus multiplexers consisting of a second bus multiplexer corresponding to each one of said plurality of buffer busses, each one of said second bus multiplexers having an output connected to its corresponding bus and having a plurality of inputs, each one of said second bus multiplexer inputs being connected to a corresponding one of said plurality of disk drive busses.

8. The apparatus according to claim 7, wherein said bus switch further comprises:

a parity generation circuit having a plurality of inputs, each one of said parity generation circuit inputs being connected to a corresponding one of said plurality of drive busses; and wherein each one of said second plurality of bus multiplexers has an input connected to the output of said parity generation circuit.

9. The apparatus according to claim 8, wherein:

said second plurality of bus multiplexers includes a third bus multiplexer having an output and a plurality of inputs, each one of said third bus multiplexer inputs being connected to a corresponding one of said plurality of disk drive busses; and said parity generation circuit includes an input connected to the output of said third bus multiplexer.

10. The apparatus according to claim 3, further comprising:

CRC logic associated with each one of said plurality of disk drive busses for generating and checking error correcting codes for data transferred on said plurality of disk drive busses.

11. The apparatus according to claim 10, wherein:

said CRC logic operates in a first mode during disk array write operations to generate error correcting codes and append the codes to data transfers on said plurality of disk drive busses; and said CRC logic operates in a second mode during disk array read operations to generate error correcting codes and compare said generated error correcting codes to error correcting codes accompanying data transfers on said plurality of disk drive busses.

12. The apparatus according to claim 3, further comprising:

a processor and DMA control logic interconnected with said host interface means, said bus switch means and said buffer storage means by an address/data bus and a plurality of control lines;

said processor providing control signals to said DMA control logic, said host interface means, said bus switch means and said buffer storage means, the configuration and operation of said DMA control logic, said host interface means, said bus switch means and said buffer storage means being determined by said control signals; and said DMA control logic providing DMA and buffer control for said disk array controller.

13. A disk array controller for interfacing a host computer system with a plurality of disk drives associated with a disk array, comprising:

a host bus;

a plurality of buffer busses;

host interface means connected between said host bus and said plurality of buffer busses and responsive to a first configuration control signal for selecting buffer busses based on a configuration of said disk array and transferring data between said host bus and at least one buffer bus selected from said plurality of buffer busses; and a plurality of drive busses;

bus switch means connected between said plurality of buffer busses and said plurality of drive busses and responsive to a second configuration control signal for selecting drive busses based on the configuration of said disk array and coupling said selected buffer busses to said selected drive busses;

control means responsive to instructions received from a host system for generating said first and second configuration control signals;

buffer storage means connected to said plurality of buffer busses for storing data received from said buffer busses and placing stored data onto said buffer busses; and a parity generation circuit having a plurality of inputs, each one of said inputs being connected to a corresponding one of said buffer and drive busses; an exclusive-OR circuit; first switch means for connecting said exclusive-OR circuit to receive data from selected ones of said buffer and drive busses for combining data received from said selected busses; and second switch means for providing the output of said exclusive-OR circuit to a selected one of said buffer and drive busses.

14. The disk array controller according to claim 13, wherein:

said host bus comprises a 16-bit SCSI bus;

said plurality of buffer busses comprises four 16-bit buffer busses;

said plurality of drive busses comprises six 16-bit drive busses; and said disk array controller further includes six SCSI adapters corresponding to said six drive busses, each one of said adapters being connected between its corresponding drive bus and a corresponding disk drive.

* * * * *